United States Patent
Hiraishi (10) Patent No.: US 10,488,841 B2
(45) Date of Patent: Nov. 26, 2019

(54) PROGRAMMABLE CONTROLLER

(71) Applicant: FANUC CORPORATION, Yamanashi (JP)

(72) Inventor: Yukihiro Hiraishi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 7 days.

(21) Appl. No.: 15/659,882

(22) Filed: Jul. 26, 2017

(65) Prior Publication Data

US 2018/0032050 A1    Feb. 1, 2018

(30) Foreign Application Priority Data

Jul. 27, 2016  (JP) .................. 2016-147145

(51) Int. Cl.
   *G05B 19/05* (2006.01)
   *G05B 19/045* (2006.01)

(52) U.S. Cl.
   CPC ........... *G05B 19/05* (2013.01); *G05B 19/045* (2013.01); *G05B 19/054* (2013.01); *G05B 2219/1127* (2013.01); *G05B 2219/11101* (2013.01); *G05B 2219/13128* (2013.01); *G05B 2219/14089* (2013.01)

(58) Field of Classification Search
   CPC .... G05B 19/05; G05B 19/054; G05B 19/045; G05B 2219/13128; G05B 2219/14089; G05B 2219/11101; G05B 2219/1127
   USPC ......................................................... 700/19
   See application file for complete search history.

(56) References Cited

U.S. PATENT DOCUMENTS

| | | | |
|---|---|---|---|
| 5,566,320 A | 10/1996 | Hubert | |
| 2011/0047416 A1* | 2/2011 | Moore | G06F 3/0607 714/48 |
| 2017/0068229 A1* | 3/2017 | Yaoita | G06F 11/32 |

FOREIGN PATENT DOCUMENTS

| | | | | |
|---|---|---|---|---|
| JP | 2001125608 A | 5/2001 | | |
| JP | 2002-312196 A | 10/2002 | | |
| JP | 2005025545 A | 1/2005 | | |
| JP | 2012-208933 A | 10/2012 | | |
| JP | 2013-140476 A | 7/2013 | | |
| JP | 2013140476 | * | 7/2013 | ........... G05B 19/042 |
| JP | 2015-53022 A | 3/2015 | | |
| WO | 2014/136185 A1 | 9/2014 | | |

OTHER PUBLICATIONS

JP2013140476 Translation from Espacenet (Year: 2013).*

* cited by examiner

*Primary Examiner* — Thomas C Lee
*Assistant Examiner* — Anzuman Sharmin
(74) *Attorney, Agent, or Firm* — Hauptman Ham, LLP (57) ABSTRACT

A programmable controller sets access rules relating to permission or denial of access to a first data storage unit during execution of a second sequence program. In addition, a first sequence program is executed while accessing only the first data storage unit, whereas the second sequence program is executed while accessing the first data storage unit and a second data storage unit in accordance with the set access rules.

2 Claims, 7 Drawing Sheets

| IDENTIFIER (ADDRESS) | SETTING |
|---|---|
| R0100 | W |
| X0002.0 | R |
| G0008 | R/W |
| D0000-0010 | R |
| Y0000.0 | W |
| .... | .. |

FIG. 7
(COMPARATIVE EXAMPLE)
PRIOR ART

PROGRAMMABLE CONTROLLER

CROSS-REFERENCE TO RELATED APPLICATION

This application is based upon and claims the benefit of priority from Japanese Patent Application No. 2016-147145 filed on Jul. 27, 2016, the contents of which are incorporated herein by reference.

BACKGROUND OF THE INVENTION

Field of the Invention

The present invention relates to a programmable controller configured to execute a plurality of sequence programs.

Description of the Related Art

Conventionally, there has been developed a PLC device (Programmable Logic Controller, hereinafter also referred to as a "programmable controller") which is capable of executing a sequence program. For example, an apparatus has been proposed in which a plurality of sequence programs are executed using a single programmable controller (see Japanese Laid-Open Patent Publication No. 2005-025545).

SUMMARY OF THE INVENTION

Incidentally, cases are known in which the manufacturer of a machine tool, along with delivery of the machine tool, provides the user with sequence programs (hereinafter also referred to as "original programs") for controlling the machine tool. At this time, there is a demand for the user to independently modify the provided programs, and to use customized sequence programs (hereinafter also referred to as "modified programs").

Figure 7:
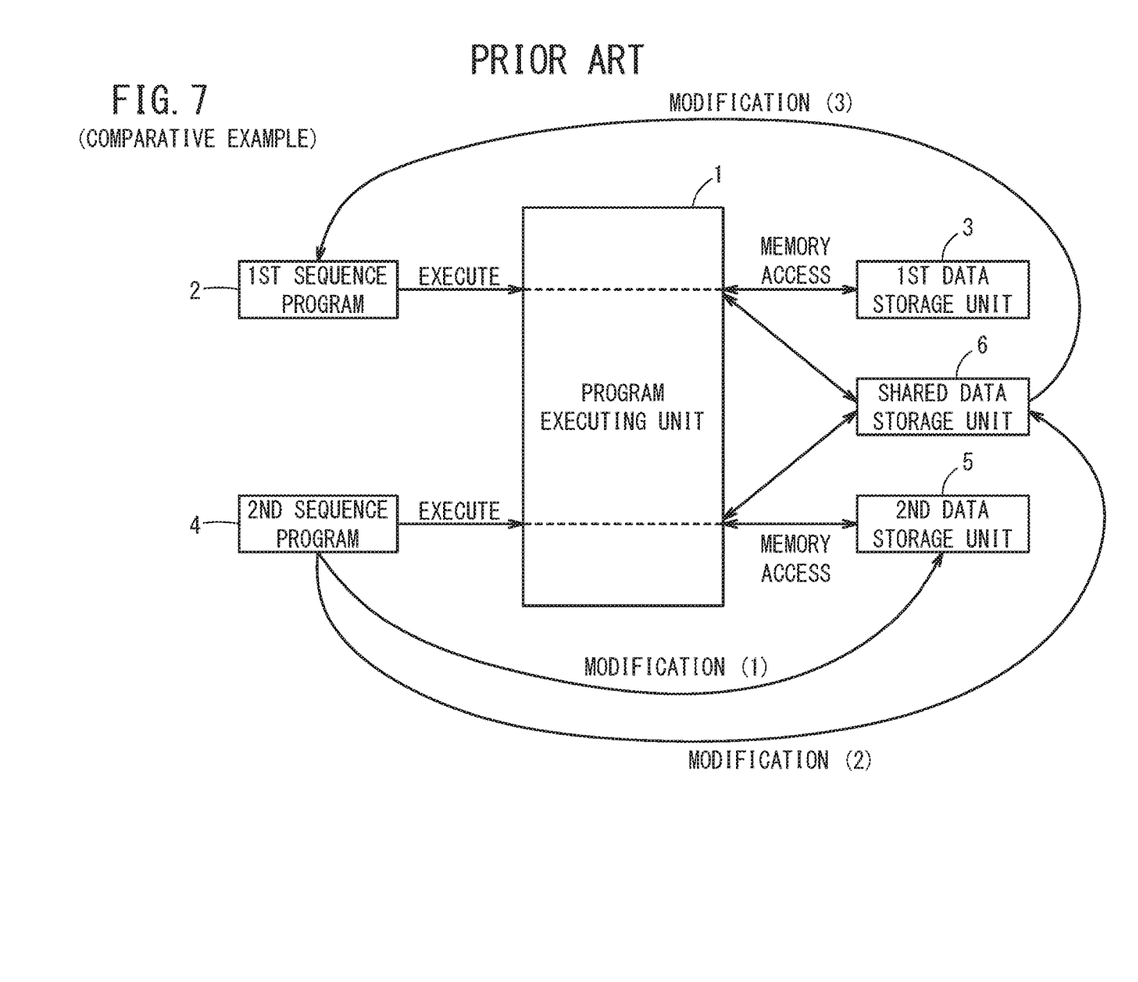
FIG. 7 is a schematic diagram for describing operations of the program executing unit in the case that a shared data storage unit is provided.

For example, as shown in FIG. 7, in which a comparative example is illustrated, a case is assumed in which a program executing unit 1 stores in a first data storage unit 3 data that is generated during execution of a first sequence program 2, and stores in a second data storage unit 5 data that is generated during execution of a second sequence program 4. In addition, a configuration is provided in which data (for example, an emergency stop signal) intended to be shared between the first sequence program 2 and the second sequence program 4 can be stored in a shared data storage unit 6.

However, when portions of the second sequence program 4 are altered, cases may occur in which not only the second data storage unit 5, but also a definition of the memory area in the shared data storage unit 6 may have to be modified. As a result, in accordance with a definition modification in the shared data storage unit 6, a modification of the first sequence program 2 is forced to be made.

In this manner, in order to share data between an original program and a modified program, as long as a general data management method as shown in FIG. 7 is used, a need arises to change the content of the original program. More specifically, from the viewpoint of simplifying data sharing, there is sufficient room for improvement.

The present invention has been devised with the aim of solving the aforementioned problem, and has the object of providing a programmable controller, which is capable of sharing portions of data among a plurality of sequence programs, without making changes to the content of a specified sequence program.

A programmable controller according to the present invention is a controller configured to execute a plurality of sequence programs, including a first data storage unit in which there are stored in association with each other state values, and identifiers of signal memories defined in a first sequence program, a second data storage unit in which there are stored in association with each other state values, and identifiers of signal memories defined in a second sequence program that differs from the first sequence program, a rule setting unit configured to set access rules relating to permission or denial of access to the first data storage unit during execution of the second sequence program, and a program executing unit configured to execute the first sequence program while accessing only the first data storage unit, and on the other hand, to execute the second sequence program while accessing the first data storage unit and the second data storage unit in accordance with the access rules set by the rule setting unit.

With such a configuration, while ensuring the independence of the first sequence program, even during execution of the second sequence program, the first data storage unit (that is, a storage area thereof for shared data) is capable of being accessed within a scope that complies with the access rules. Consequently, it is possible for portions of data to be shared among a plurality of sequence programs, without making changes to the content of the first sequence program.

Further, in relation to the programmable controller according to the present invention, the rule setting unit may set the access rules by which the permission attributes for access to the state values are granted, for each of the identifiers of the signal memories that are commonly defined in the first sequence program and the second sequence program. In accordance with this feature, detailed settings can be made for each of the commonly defined signal memories.

Further, in relation to the programmable controller according to the present invention, during execution of the first sequence program, the program executing unit may invalidate updating of the state values in the first data storage unit, in relation to an identifier of one of the signal memories to which a write permission attribute was granted in accordance with the access rules. In accordance with this feature, it is possible to prevent the occurrence of an unexpected operation of the first sequence program caused by an execution result of the second sequence program.

Further, in relation to the programmable controller according to the present invention, the second sequence program may be a sequence program created by customizing the first sequence program. In accordance with this feature, customization can be performed with a high degree of freedom, without necessarily considering the consistency of the first sequence program.

In accordance with the programmable controller according to the present invention, it is possible for portions of data to be shared among a plurality of sequence programs, without making changes to the content of a specified sequence program.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a programmable controller according to the present invention will be described below with reference to the accompanying drawings.

[Configuration of PLC Device 10]

<Overall Configuration>

Figure 1:
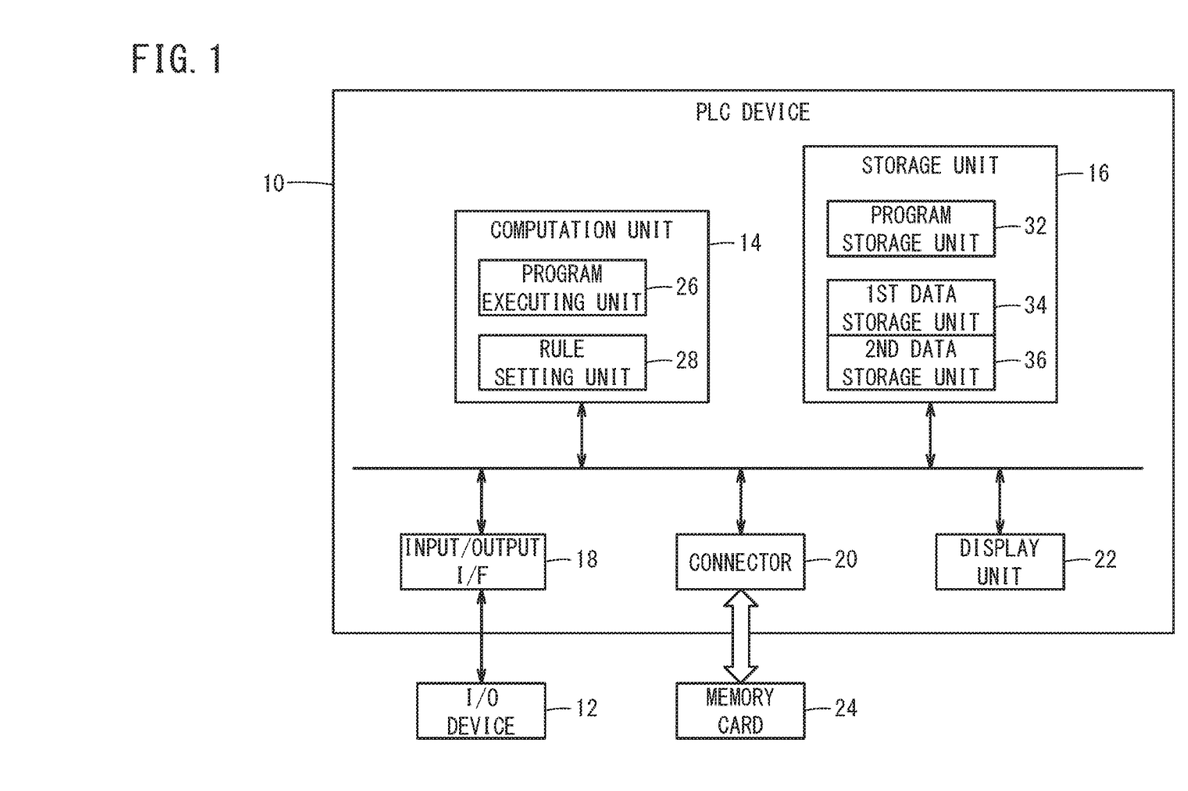
FIG. 1 is a block diagram of a programmable controller (PLC device) according to an embodiment of the present invention.

FIG. 1 is a block diagram of a programmable controller (hereinafter referred to as a PLC device 10) according to an embodiment of the present invention. The PLC device 10 is a device that controls operations of one or a plurality of machine tools (not shown) connected to an I/O device 12, according to a sequential order or conditions determined by sequence programs. The PLC device 10 is constituted to include a computation unit 14, a storage unit 16, an input/output I/F 18, a connector 20, and a display unit 22.

The input/output I/F 18 is an interface for connecting the PLC device 10 and the I/O device 12 to enable communications therebetween. The connector 20 is configured such that a memory card 24, which is one form of an external storage medium, is capable of being inserted into and removed from the connector 20. The display unit 22 is capable of offering, and more particularly displaying, visible information for an operator, based on display data generated by the computation unit 14.

The computation unit 14 is constituted by a processor of a CPU (Central Processing Unit) or an MPU (Micro Processing Unit). The computation unit 14 is capable of realizing respective functions, including a program executing unit 26 in which a plurality of sequence programs are executed, and a rule setting unit 28 for setting access rules 60 (see FIGS. 2 and 3) during execution of the sequence programs, by reading and executing a system program (not shown) stored in the storage unit 16.

The storage unit 16 is constituted from at least one of a volatile or nonvolatile memory device. The memory device, for example, is constituted by a ROM (Read Only Memory), a RAM (Random Access Memory), a PROM (Programmable ROM), an EEPROM (Electrically Erasable Programmable ROM), and a flash memory, or the like.

Figure 2:
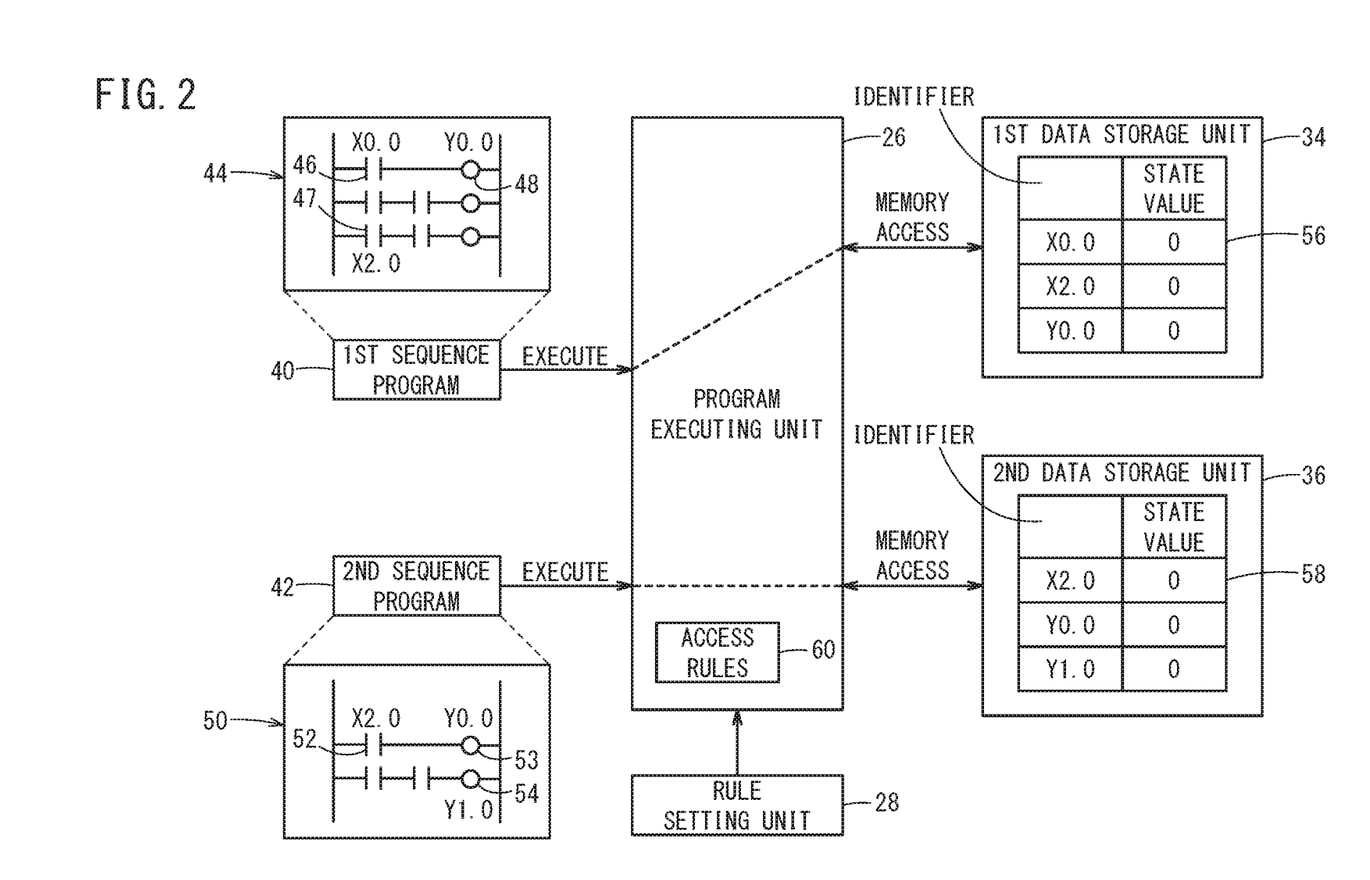
FIG. 2 is a schematic diagram illustrating functions of a program executing unit shown in FIG. 1.

In the illustrated example of the present figures, the storage unit 16 is constituted to include a program storage unit 32, which is capable of storing a plurality of sequence programs, a first data storage unit 34, which is capable of storing data concerned with execution of a first sequence program 40 (FIG. 2), and a second data storage unit 36, which is capable of storing data concerned with execution of a second sequence program 42 (FIG. 2).

<Configuration of Program Executing Unit 26>

FIG. 2 is a schematic diagram illustrating functions of the program executing unit 26 shown in FIG. 1. The program executing unit 26 executes alternatively or in parallel a plurality of sequence programs (for example, the first sequence program 40 or the second sequence program 42) which are read out from the program storage unit 32 (see FIG. 1). In this instance, the first sequence program 40 is a program created by a manufacturer of a non-illustrated machine tool. Further, the second sequence program 42 is a program created by an operator as an end user, by customizing portions of the first sequence program 40.

The first sequence program 40, for example, using a ladder language, describes a first ladder diagram 44 made up from a plurality of signal memories. Hereinbelow, for simplifying the description, among the signal memories that make up the first ladder diagram 44, attention is focused only on a contact 46 for which an identifier thereof is "X0.0", a contact 47 for which an identifier thereof is "X2.0", and a load 48 for which an identifier thereof is "Y0.0".

The second sequence program 42, for example, using a ladder language, describes a second ladder diagram 50 made up from a plurality of signal memories. Hereinbelow, for simplifying the description, among the signal memories that make up the second ladder diagram 50, attention is focused only on a contact 52 for which an identifier thereof is "X2.0", a load 53 for which an identifier thereof is "Y0.0", and a load 54 for which an identifier thereof is "Y1.0".

The first data storage unit 34 includes a first memory area 56 for storing signals (i.e., state values of signal memories) generated during execution of the first sequence program 40. For example, in the case that the contacts 46, 47 and the load 48 are all bit devices, the state values (1 bit units) of the signal memories are stored in the first memory area 56 at addresses corresponding to the identifiers.

The second data storage unit 36 includes a second memory area 58 for storing signals (i.e., state values of signal memories) generated during execution of the second sequence program 42. For example, in the case that the contacts 52 and the loads 53, 54 are all bit devices, the state values (1 bit units) of the signal memories are stored in the second memory area 58 at addresses corresponding to the identifiers.

Incidentally, the rule setting unit 28 sets access rules 60 relating to permission or denial of access to the first data storage unit 34 during execution of the second sequence program 42. The program executing unit 26 executes the second sequence program 42 according to the access rules 60 set by the rule setting unit 28.

Figure 3:
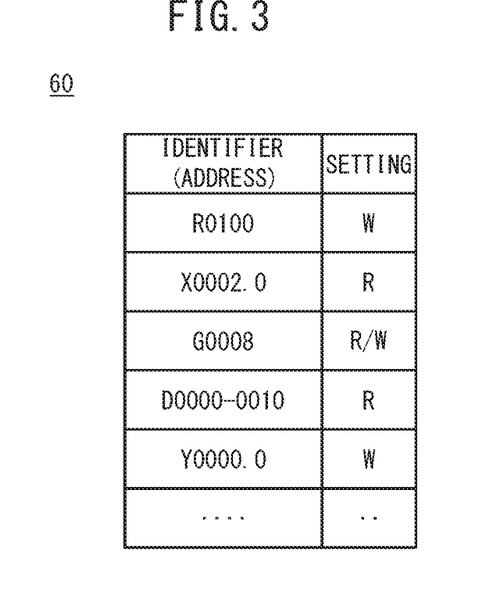
FIG. 3 is a diagram illustrating the content of access rules shown in FIG. 2.

As shown in FIG. 3, the access rules 60 are table data indicative of permission attributes for respective identifiers (addresses) relating to the signal memories commonly defined in the first sequence program 40 and the second sequence program 42. Among the three types of permission attributes, there are indicated "R" for "read permission", "W" for "write permission", and "R/W" for "read/write permission".

According to the present illustrated example, an access authority of read permission is granted to the identifiers or addresses of "X0002.0" (corresponding to "X2.0" of the contacts 47 and 52) and "D0000-0010". Further, an access authority of write permission is granted to the identifiers or addresses of "R0100" and "Y0000.0" (corresponding to "Y0.0" of the loads 48 and 53). Further, an access authority of read/write permission is granted to the identifier or address of "G0008".

In the foregoing manner, the rule setting unit 28 may set the access rules 60 by which the permission attributes for access to the state values are granted, for each of the identifiers of the signal memories (contacts 47, 52 and loads 48, 53) that are commonly defined within the first sequence program 40 and the second sequence program 42. In accordance with this feature, detailed settings can be made for each of the commonly defined signal memories.

[Operations of Program Executing Unit 26]

Next, operations of the program executing unit 26 (FIG. 2) in which the access rules 60 (FIG. 3) have been set will be described with reference to FIGS. 4 to 6.

Figure 4:
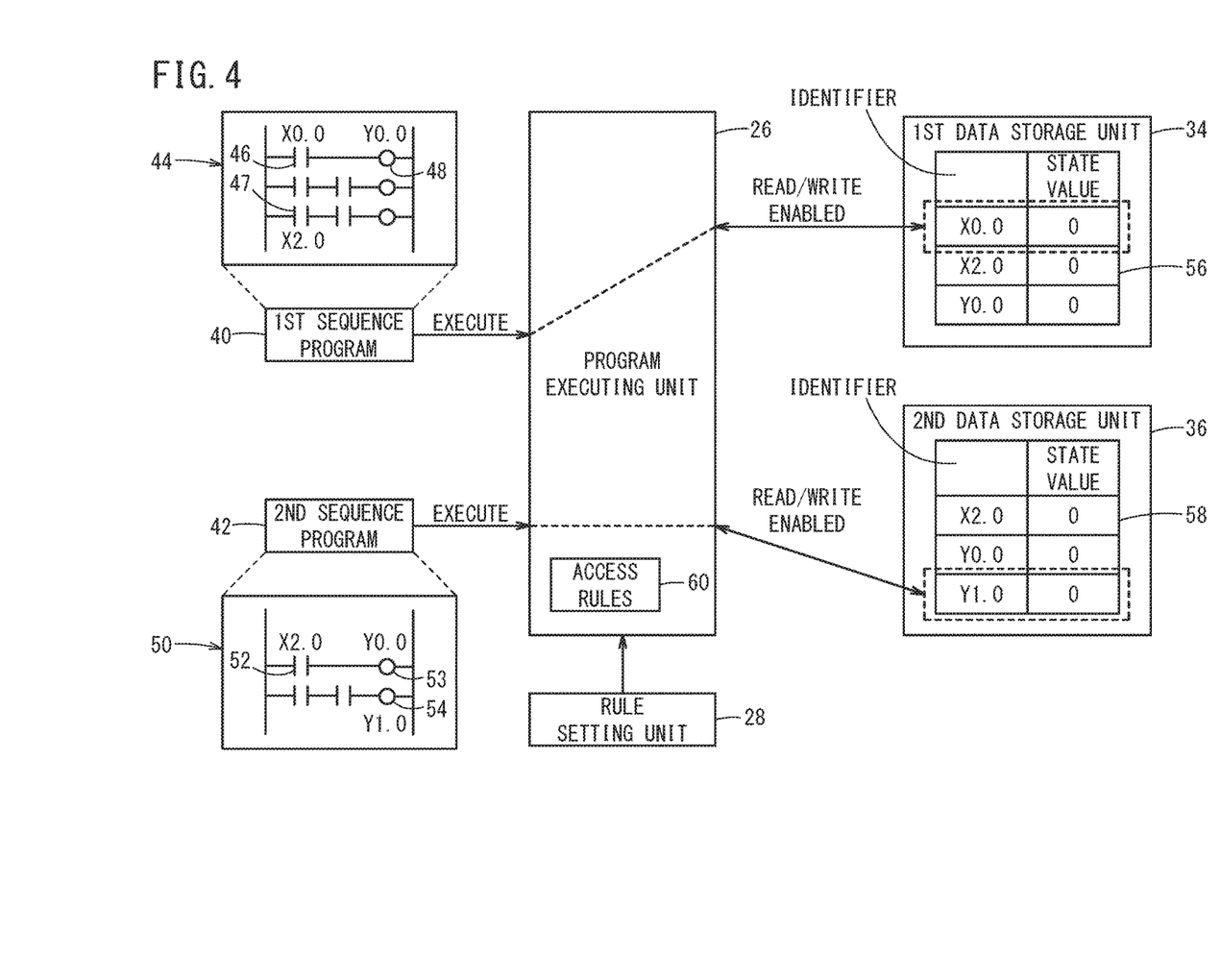
FIG. 4 is a diagram showing a first operation performed by the program executing unit.

FIG. 4 is a diagram showing a first operation performed by the program executing unit 26. In the present figure, a case is assumed of accessing data in which the identifiers of the signal memories do not coincide with each other. The program executing unit 26 executes the first sequence program 40 while granting normal access authority (in this instance, "read/write permission") with respect to the identifier "X0.0", which is not listed in the access rules 60. On the other hand, the program executing unit 26 executes the second sequence program 42 while granting normal access authority (in this instance, "read/write permission") with respect to the identifier "Y1.0", which is not listed in the access rules 60.

Figure 5:
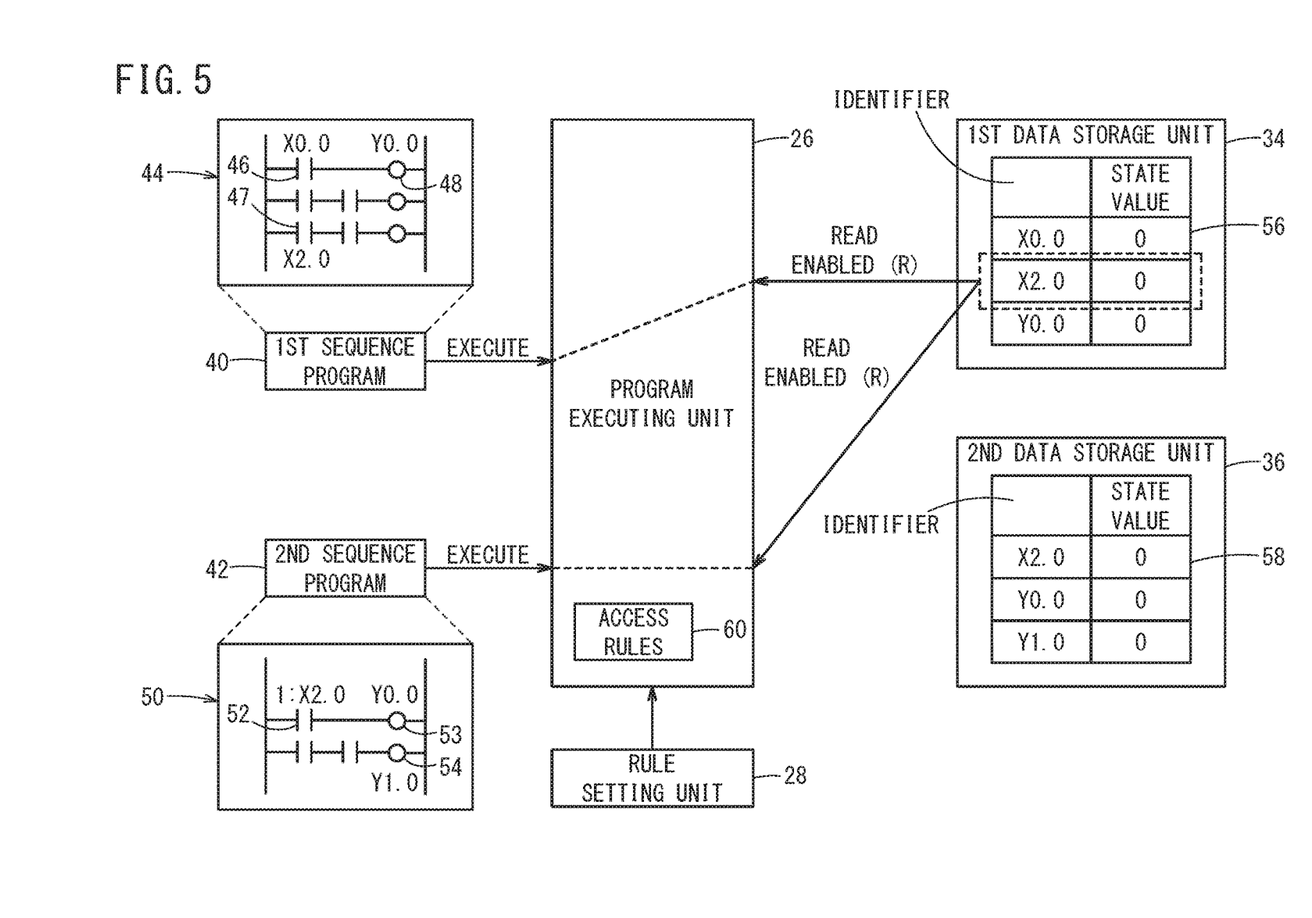
FIG. 5 is a diagram showing a second operation performed by the program executing unit.

FIG. 5 is a diagram showing a second operation performed by the program executing unit 26. In the present figure, a case is assumed of accessing data (read permission) in which the identifiers of the signal memories coincide with each other. The program executing unit 26 executes the first sequence program 40 while granting normal access authority (in this instance, "read permission") with respect to the identifier "X2.0", which is listed in the access rules 60. On the other hand, the program executing unit 26 executes the second sequence program 42 while granting an access authority (in this instance, "read permission") according to the access rules 60 with respect to the identifier "X2.0", which is listed in the access rules 60.

Figure 6:
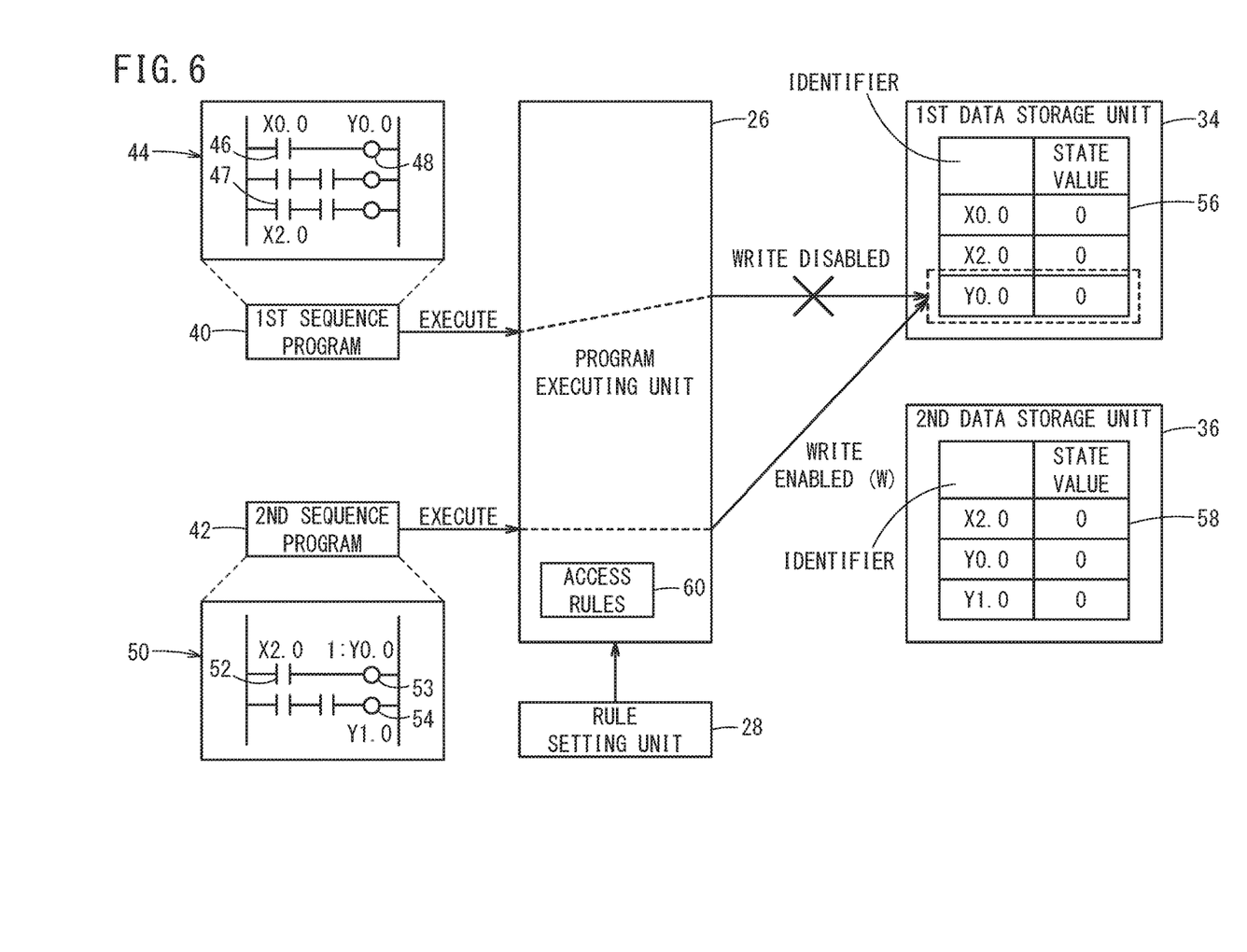
FIG. 6 is a diagram showing a third operation performed by the program executing unit.

FIG. 6 is a diagram showing a third operation performed by the program executing unit 26. In the present figure, a case is assumed of accessing data (write permission) in which the identifiers of the signal memories coincide with each other. The program executing unit 26 executes the first sequence program 40 while invalidating the access authority (set to "write non-permission") with respect to the identifier "Y0.0", which is listed in the access rules 60. In this case, instead of invalidating the write operation to the identifier "Y0.0", the program executing unit 26 modifies the write instruction, and designates an unused address inside the first memory area 56, whereby it is possible to maintain the identity of the operation by the first sequence program 40.

On the other hand, the program executing unit 26 executes the second sequence program 42 while granting an access authority (in this instance, "write permission") according to the access rules 60 with respect to the identifier "Y0.0", which is listed in the access rules 60.

In the foregoing manner, during execution of the first sequence program 40, the program executing unit 26 may invalidate updating of the state values in the first data storage unit 34, in relation to an identifier of the signal memory (load 48) to which a write permission attribute was granted in accordance with the access rules 60. In accordance with this feature, it is possible to prevent the occurrence of an unexpected operation of the first sequence program 40 caused by an execution result of the second sequence program 42.

[Effects of the PLC Device 10]

As described above, the PLC Device 10 is equipped with [1] the first data storage unit 34 in which there are stored in association with each other the state values, and the identifiers of the signal memories (contacts 46, 47, load 48) defined in the first sequence program 40, [2] the second data storage unit 36 in which there are stored in association with each other the state values, and the identifiers of the signal memories (contact 52, loads 53, 54) defined in the second sequence program 42 that differs from the first sequence program 40, [3] the rule setting unit 28 which sets the access rules 60 relating to permission or denial of access to the first data storage unit 34 during execution of the second sequence program 42, and [4] the program executing unit 26 which executes the first sequence program 40 while accessing only the first data storage unit 34, and on the other hand, executes the second sequence program 42 while accessing the first data storage unit 34 and the second data storage unit 36 in accordance with the set access rules 60.

Further, a program execution method carried out by the PLC device 10 (computer) comprises [1] a first storing step of storing in association with each other in the first data storage unit 34 the state values, and the identifiers of the signal memories defined in the first sequence program 40, [2] a second storing step of storing in association with each other in the second data storage unit 36 the state values, and the identifiers of the signal memories defined in the second sequence program 42 that differs from the first sequence program 40, [3] a setting step of setting the access rules 60 relating to permission or denial of access to the first data storage unit 34 during execution of the second sequence program 42, and [4] an executing step of executing the first sequence program 40 while accessing only the first data storage unit 34, and on the other hand, executing the second sequence program 42 while accessing the first data storage unit 34 and the second data storage unit 36 in accordance with the set access rules 60.

With such a configuration, while ensuring the independence of the first sequence program 40, even during execution of the second sequence program 42, the first data storage unit 34 (that is, a storage area thereof for shared data) is capable of being accessed within a scope that complies with the access rules 60. Consequently, it is possible for portions of data to be shared among the first sequence program 40 and the second sequence program 42, without making changes to the content of the first sequence program 40.

In particular, the second sequence program 42 is preferably a sequence program created by customizing the first sequence program 40. This is because such customization can be performed with a high degree of freedom, without necessarily considering the consistency of the first sequence program 40.

REMARKS

The present invention is not limited to the embodiment described above, and it goes without saying that the invention can be freely modified within a range that does not deviate from the scope of the present invention as set forth in the appended claims. Alternatively, the respective configurations may be arbitrarily combined within a range in which no technical inconsistencies occur.

For example, according to the present embodiment, although an example was described in which the program executing unit 26 executes two sequence programs, the present invention can also be applied to execution of three or more sequence programs.

What is claimed is:

1. A programmable controller configured to execute a plurality of sequence programs, comprising:

a first data storage unit in which there are stored in association with each other state values, and identifiers of signal memories defined in a first sequence program;

a second data storage unit in which there are stored in association with each other state values, and identifiers of signal memories defined in a second sequence program that differs from the first sequence program;

a rule setting unit configured to set access rules relating to permission or denial of access to the first data storage unit during execution of the second sequence program, wherein the rule setting unit sets the access rules by which permission attributes for access to the state values associated with the identifiers are granted to each of the identifiers that are commonly defined in the first sequence program and the second sequence program; and a program executing unit configured to execute the first sequence program while accessing the first data storage unit, and to execute the second sequence program while accessing the first data storage unit and the second data storage unit in accordance with the access rules, wherein the program executing unit invalidates updating of the state values associated with the identifiers to which a write permission attribute was granted in accordance with the access rules, the updating being performed by executing the first sequence program during execution of the first sequence program, wherein the program executing unit modifies a write instruction of the first sequence program that updates the state values associated with the identifiers to which the write permission attribute was granted in accordance with the access rules, to a write instruction that designates an identifier for identifying an unused area inside the first data storage unit.

2. The programmable controller according to claim 1, wherein the second sequence program is a sequence program created by customizing the first sequence program.

\* \* \* \* \*